(12) United States Patent
Takahashi et al.

(10) Patent No.: US 8,520,368 B2
(45) Date of Patent: Aug. 27, 2013

(54) GAS INSULATED SWITCHGEAR

(75) Inventors: Kazuki Takahashi, Tokyo (JP); Mitsuru Tsukima, Tokyo (JP); Hitoshi Sadakuni, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 395 days.

(21) Appl. No.: 13/058,867

(22) PCT Filed: Sep. 11, 2008

(86) PCT No.: PCT/JP2008/066469
§ 371 (c)(1),
(2), (4) Date: Feb. 14, 2011

(87) PCT Pub. No.: WO2010/029632
PCT Pub. Date: Mar. 18, 2010

(65) Prior Publication Data
US 2011/0149481 A1 Jun. 23, 2011

(51) Int. Cl.
*H02B 1/20* (2006.01)
(52) U.S. Cl.
USPC ......... 361/612; 361/621; 361/648; 174/26 G; 218/50; 218/76; 218/80
(58) Field of Classification Search
USPC ................. 361/604, 611–612, 618–621, 641, 361/643
See application file for complete search history.

(56) References Cited

U.S. PATENT DOCUMENTS

| | | | |
|---|---|---|---|
| 4,005,297 A * | 1/1977 | Cleaveland | 218/118 |
| 7,848,084 B2 * | 12/2010 | Hama et al. | 361/619 |
| 8,339,773 B2 * | 12/2012 | Frassineti et al. | 361/677 |
| 2004/0095711 A1 * | 5/2004 | Aoki et al. | 361/612 |

FOREIGN PATENT DOCUMENTS

| | | |
|---|---|---|
| JP | 49 107676 | 9/1974 |
| JP | 57 58924 | 4/1982 |
| JP | 58 22035 | 2/1983 |
| JP | 58-93414 A | 6/1983 |
| JP | 2 60425 | 5/1990 |
| JP | 5-316615 A | 11/1993 |

(Continued)

OTHER PUBLICATIONS

Office Action issued Jun. 5, 2012 in Japanese Patent Application No. 2010-528569 with partial English language translation.

(Continued)

*Primary Examiner* — Courtney Smith
(74) *Attorney, Agent, or Firm* — Oblon, Spivak, McClelland, Maier & Neustadt, L.L.P.

(57) ABSTRACT

An object is to provide gas insulated switchgear that is able to inhibit heat generation of a pressure container. Electrically-conductive members that are non-magnetic and have higher electric conductivity than that of the material of which the pressure container is made, are provided on the inside and on the outside of the pressure container, while being positioned along a main bus and being attached via a flange of the pressure container. Thus, eddy current that occurs when an electric current flows through the main bus are caused to flow through the electrically-conductive members having higher electric conductivity than that of the pressure container. Also, a current return path for the eddy current is formed by a flow path including the electrically-conductive members. Consequently, it is possible to reduce the eddy current flowing on the pressure container and to inhibit an increase in the temperature of the pressure container.

12 Claims, 13 Drawing Sheets

(56) References Cited

FOREIGN PATENT DOCUMENTS

| JP | 6 139885 | 5/1994 |
|---|---|---|
| JP | 7 15814 | 1/1995 |
| JP | 8 84413 | 3/1996 |
| JP | 9 121413 | 5/1997 |
| JP | 9-127160 A | 5/1997 |
| JP | 9-294316 A | 11/1997 |
| JP | 2002 291124 | 10/2002 |
| JP | 2004 281302 | 10/2004 |

OTHER PUBLICATIONS

Office Action issued Aug. 7, 2012 in Japanese Patent Application No. 2010-528569 with English language translation.
International Search Report issued Dec. 9, 2008 in PCT/JP08/066469 filed Sep. 11, 2008.

* cited by examiner

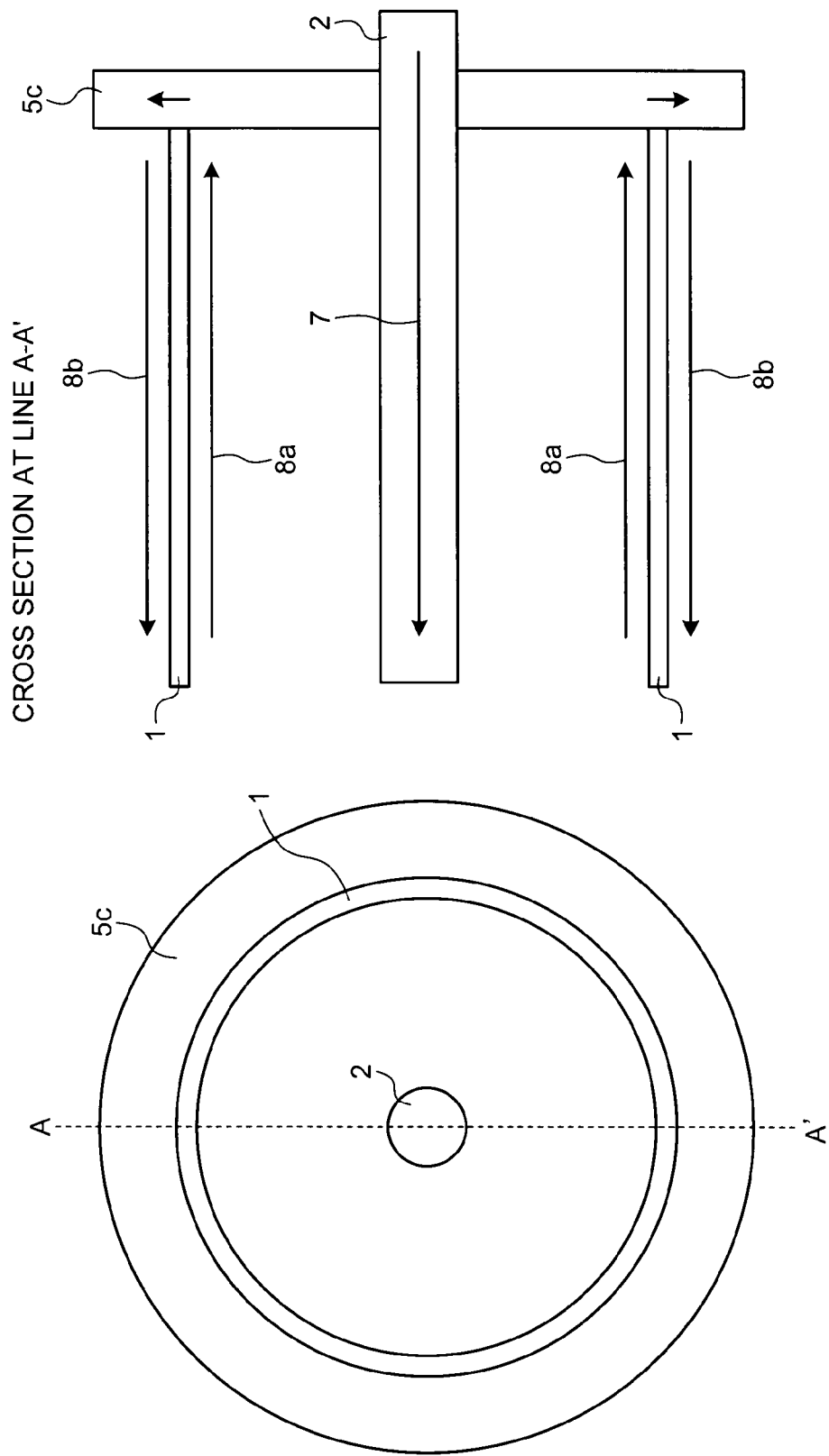

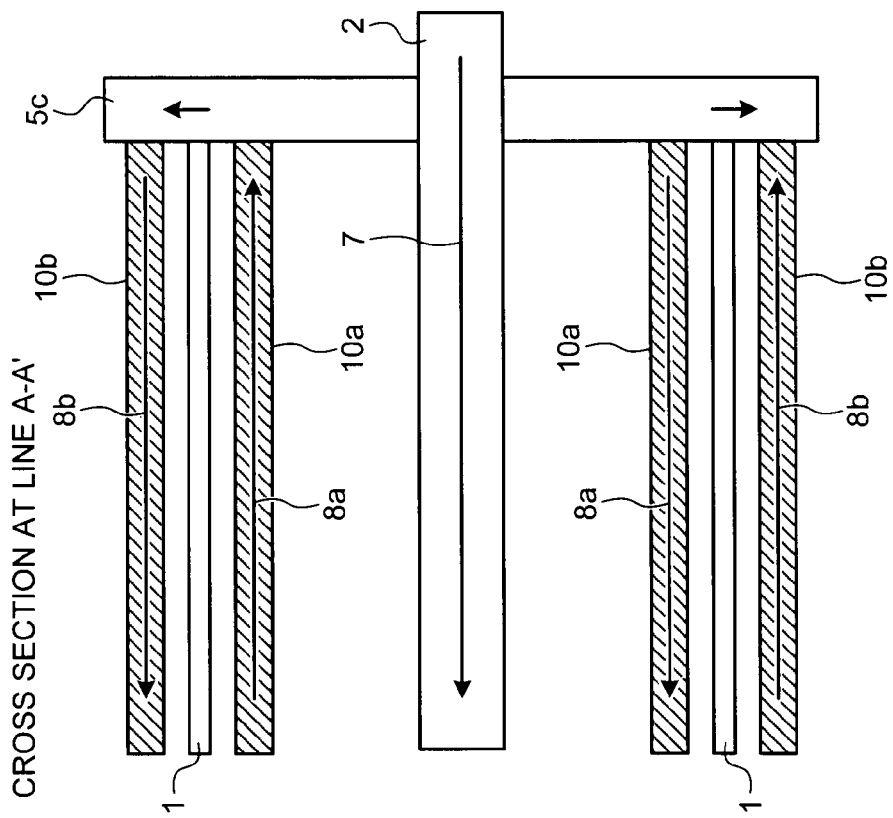
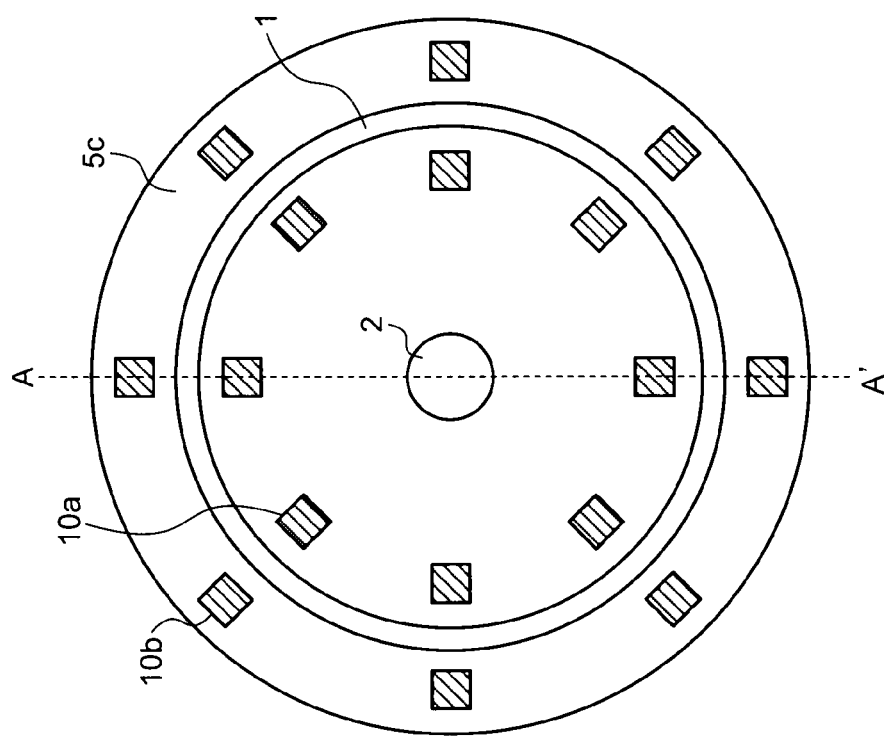

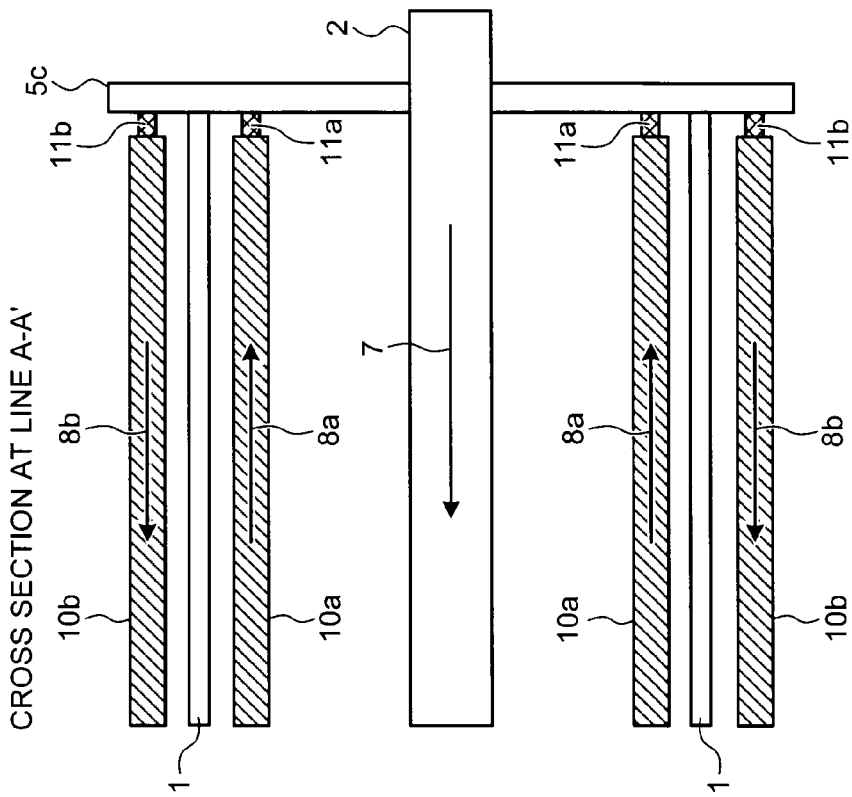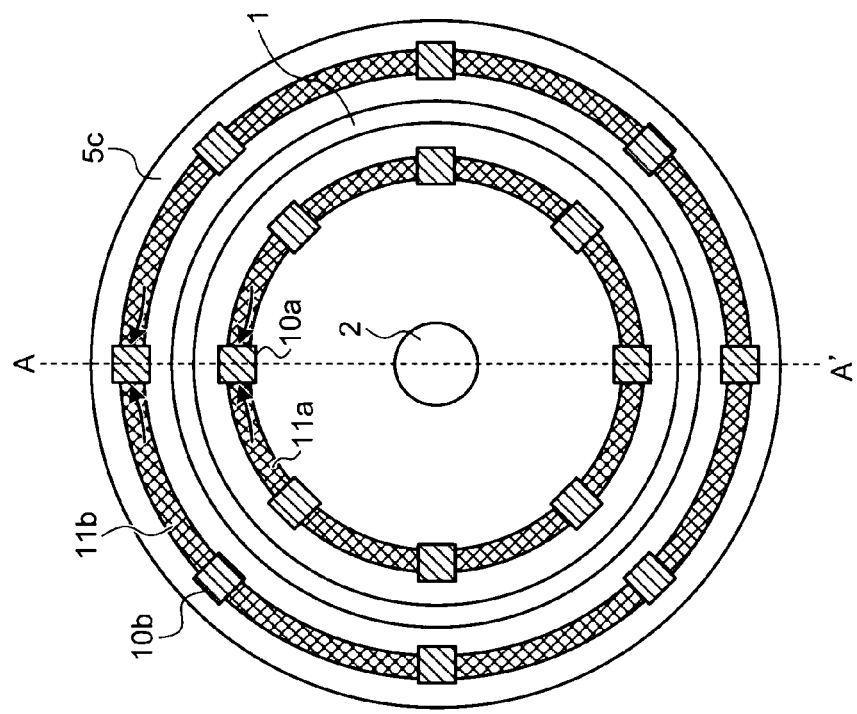

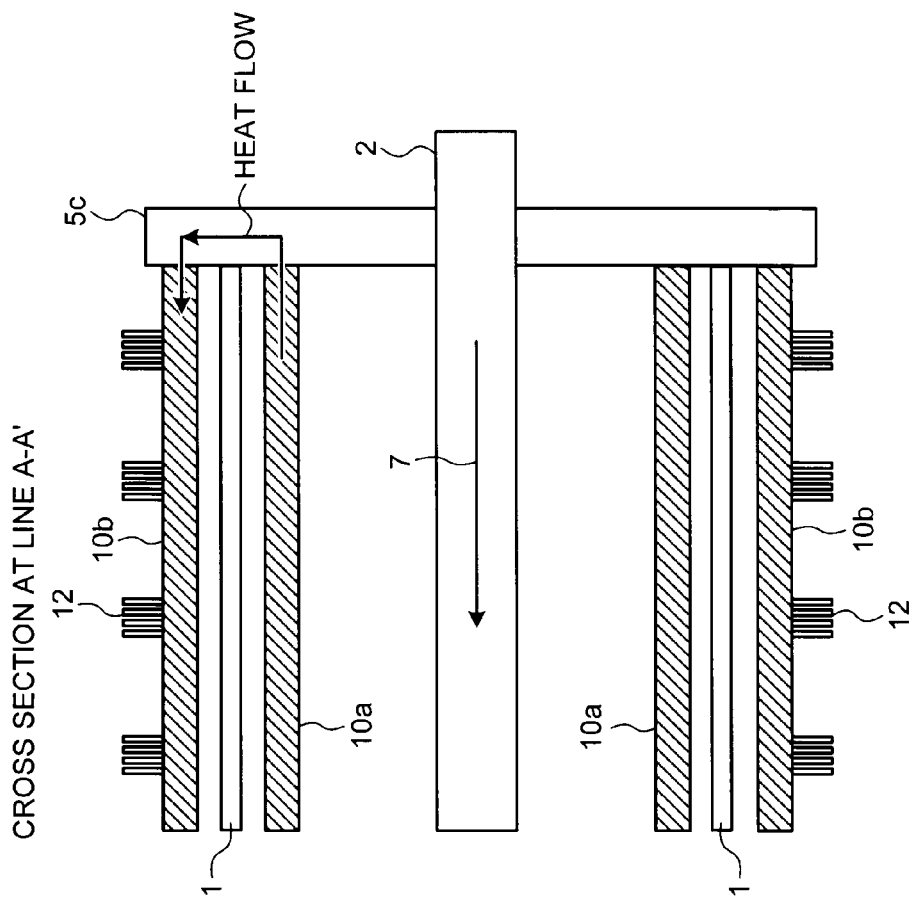
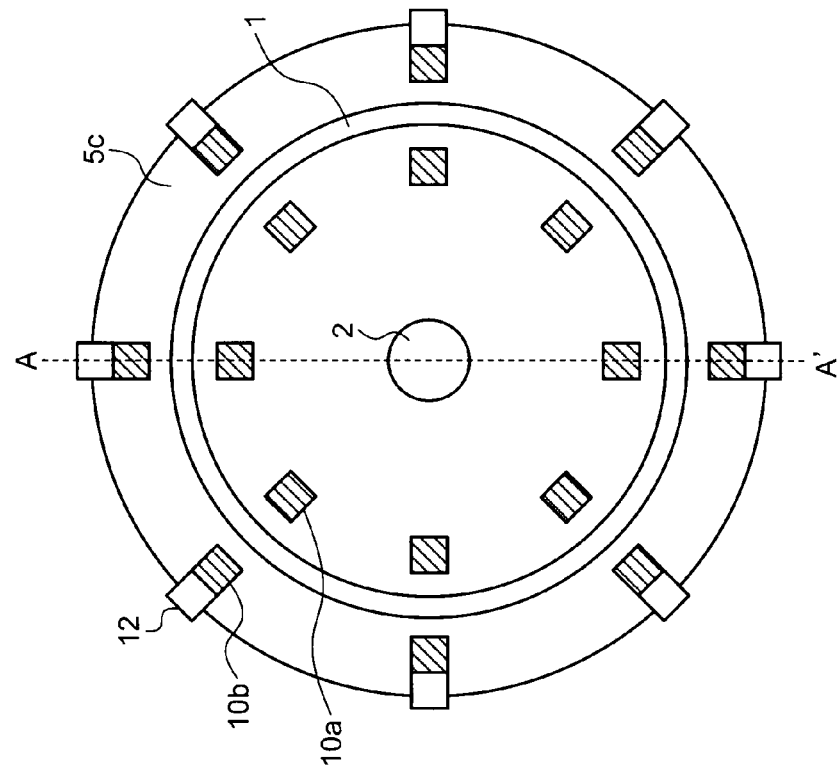

TO FIG. 14B    TO FIG. 14C

ENLARGED VIEW

ENLARGED VIEW

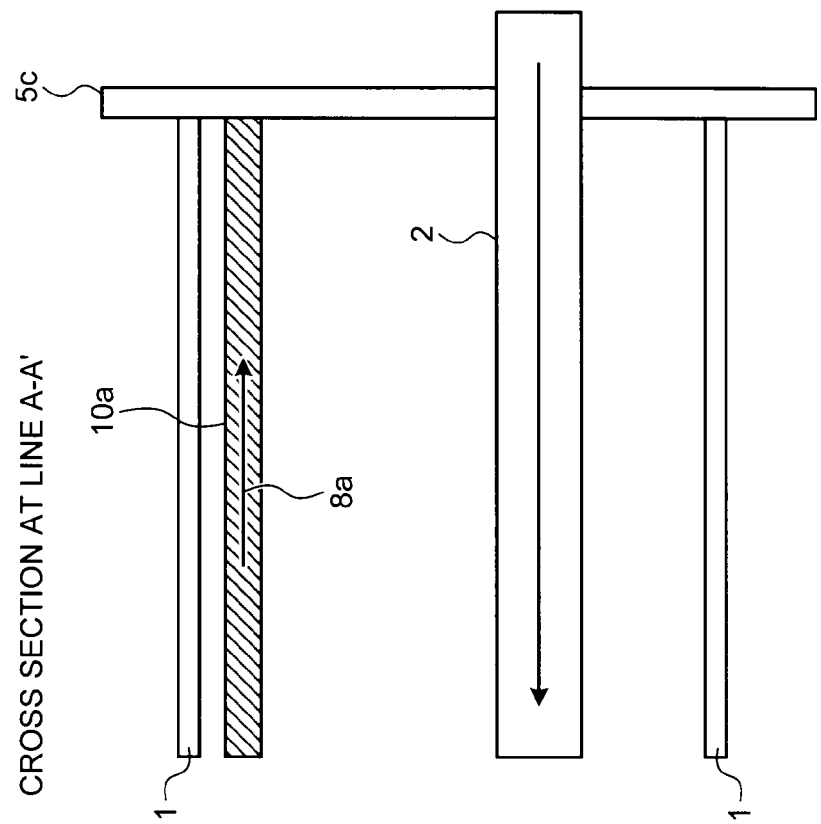
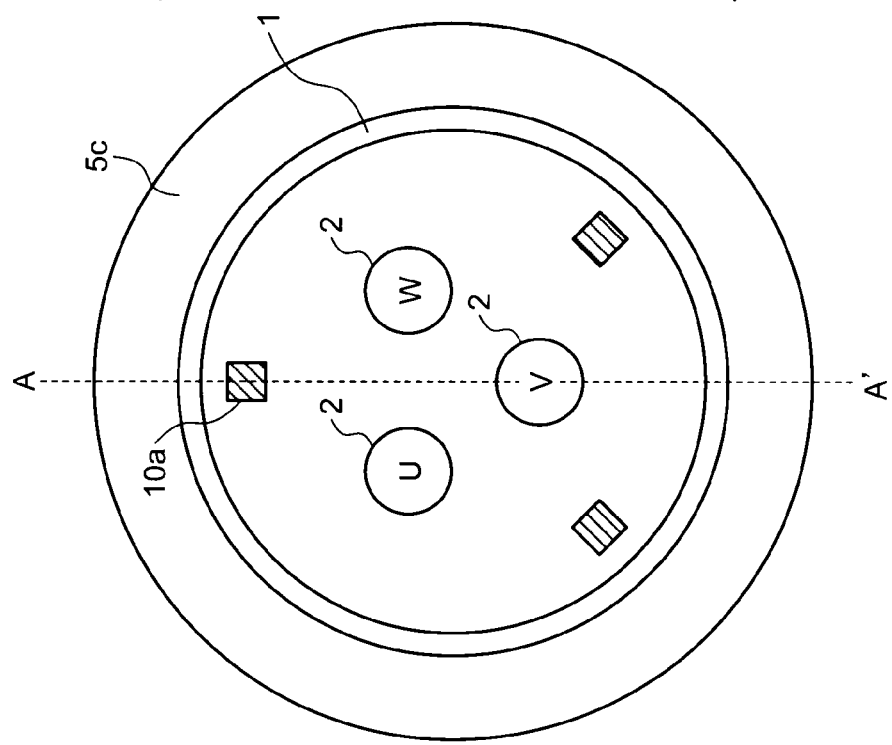

CROSS SECTION AT LINE A-A'

GAS INSULATED SWITCHGEAR

TECHNICAL FIELD

The present invention relates to gas insulated switchgear.

BACKGROUND ART

Gas insulated switchgear is configured so as to include a main bus, a circuit breaker, a disconnector/earth switch, a current transformer, and a pressure container in which high-pressure $SF_6$ gas or the like is enclosed. Further, the main bus that is configured by using, for example, aluminum, copper, or the like is arranged so that a load current flows therethrough, while the main bus is disposed in the pressure container.

When the load current is caused to flow through the main bus, a magnetic field is generated in the surrounding thereof, so that the pressure container has eddy currents that flow in such a manner that the magnetic field is to be cancelled. For this reason, in the case where the material of which the pressure container is made, is a magnetic material, a problem related to Joule heating caused by the eddy currents arises. In this situation, in the case where the material of which the pressure container is made, is a magnetic material, because an induced current flows on the surface of the pressure container, the current density is large. In addition, because there is a large hysteresis loss, the increase in the temperature caused by the heat generation is also large. In contrast, in the case where the material of which the pressure container is made, is a non-magnetic material, because the induced current flows not only on the surface of the pressure container, but also with a certain depth, the current density is smaller. In addition, because the hysteresis loss is smaller, it is possible to inhibit the increase in the temperature caused by the heat generation. Further, generally speaking, the load current value to be used is different for each user, and the amount of heat generation of the pressure container is proportional to the square of the load current value. Thus, when the load current value increases, the amount of heat generation of the pressure container greatly changes. For example, although it is possible to use a pressure container made of a magnetic material when the load current value is 2000 amperes, the amount of heat generation corresponding to a load current value of 3000 amperes is approximately 2.3 times as large as the amount of heat generation corresponding to a load current value of 2000 amperes, so that, in some situations, it may be necessary to use a pressure container that is made of a non-magnetic material. In other words, in some situations, it is necessary to select between a pressure container made of a magnetic material and a pressure container made of a non-magnetic material, based on the load current value. Further, even if the load current value is at such a level that allows a pressure container made of a magnetic material to be used, if the exterior dimension of the pressure container is arranged to be small, the amount of heat generation increases, and it becomes necessary to use a pressure container that is made of a non-magnetic material. Because pressure containers have a high possibility of being touched by inspection staff during machine inspection processes or the like, it is obligated to inhibit the increase in the temperature of the pressure containers to the extent that no problem is caused even if someone touches the pressure containers.

Patent Document 1 describes a technique for inhibiting an increase in the temperature of a pressure container by providing an electrically-conductive member between a pair of nozzles disposed on the upper part of the pressure container so as to connect the pair of nozzles together, and causing eddy current to flow through the electrically-conductive member in a direction opposite to the flow of a load current.

Further, Patent Document 2 describes a configuration in which a pressure container is configured by using a clad plate that is obtained by joining a copper plate to the inside of a stainless steel plate. In this situation, because eddy current flows through the copper, which has lower resistivity, it is possible to inhibit an increase in the temperature of the pressure container without having to make the diameter of the pressure container large.

Patent Document 1: Japanese Patent Application Laid-open No. 2004-281302

Patent Document 2: Japanese Patent Application Laid-open No. H07-15814

DISCLOSURE OF INVENTION

Problem to be Solved by the Invention

The conventional techniques described above, however, have problems as described below: according to the technique described in Patent Document 1, because only the eddy current in a part of the pressure container flows through the electrically-conductive member, a problem remains where the effect of inhibiting the increase in the temperature is small.

Further, according to the configuration described in Patent Document 2, because the pressure container is configured by using the clad plate that is made of stainless steel and copper, a problem remains where the manufacturing cost is high. Further, because the pressure container is configured by joining copper with stainless steel, which is a non-magnetic material, it is considered that the heat generation inhibiting effect achieved by adding copper to the non-magnetic material that already has a heat generation inhibiting effect, is small.

Generally speaking, methods for inhibiting Joule heating of a pressure container include a method by which the pressure container is configured by using a non-magnetic material, or a method by which the distance between the main bus and the pressure container is arranged to be long, so as to reduce the amount of magnetic fluxes that pass through the inside of the pressure container. However, when the pressure container is configured by using a non-magnetic material, the cost becomes high; and when the distance between the main bus and the pressure container is arranged to be long, the apparatus becomes large. For these reasons, problems related to cost reduction and space saving remain.

With a view to solving the problems described above, it is an object of the present invention to provide gas insulated switchgear that is able to inhibit the heat generation of the pressure container.

Means for Solving Problem

In order to solve the aforementioned problems and attain the aforementioned object, gas insulated switchgear according to one aspect of the present invention is constructed in such manner as to have a pressure container made up of a plurality of cylindrical containers that are electrically conductive and are connected to one another via flange portions formed on ends of the cylindrical containers, an inside of the pressure container being hermetically filled with an electrically-insulating gas; a circuit breaking unit that is housed in the pressure container; a main bus that is connected to the circuit breaking unit; one or more electrically-conductive members that are provided so as to be positioned along a wall surface of the pressure container and along a direction in which the main bus extends and that have higher electric conductivity than electric conductivity of a material of which the pressure container is made; and an attachment part that is made of an electrically-conductive material and is used for attaching the electrically-conductive members to the pressure container, wherein the attachment part is configured by using at least one of the flange portions.

Effect of the Invention

According to an aspect of the present invention, by providing the electrically-conductive members that have higher electric conductivity than the electric conductivity of the material of which the pressure container is made, and by causing the eddy current that, when an electric current flows through the main bus, occurs on the wall surfaces of the pressure container, to flow through the electrically-conductive members via the attachment parts; an advantageous effect is achieved where it is possible to inhibit the eddy current from flowing on the pressure container and to inhibit the increase in the temperature of the pressure container.

BRIEF DESCRIPTION OF DRAWINGS

FIGS. 3A and 3B are a cross-sectional view at the line B-B shown in FIG. 1 and a cross-sectional view at the line A-A' shown in FIG. 3A.

FIGS. 4A and 4B are drawings of an example in which electrically-conductive members are provided on the outside and on the inside of the pressure container shown in FIGS. 3A and 3B.

FIGS. 12A and 12B are drawings of gas insulated switchgear according to a second embodiment of the present invention; FIG. 12A is a transverse cross-sectional view, whereas FIG. 12B is a lengthwise cross-sectional view.

FIGS. 13A and 13B are drawings of gas insulated switchgear according to a third embodiment of the present invention; FIG. 13A is a transverse cross-sectional view, whereas FIG. 13B is a lengthwise cross-sectional view.

FIGS. 16A and 16B are drawings of gas insulated switchgear of a three-phase-in-one type according to a fifth embodiment of the present invention.

EXPLANATIONS OF LETTERS OR NUMERALS

Figure 1:
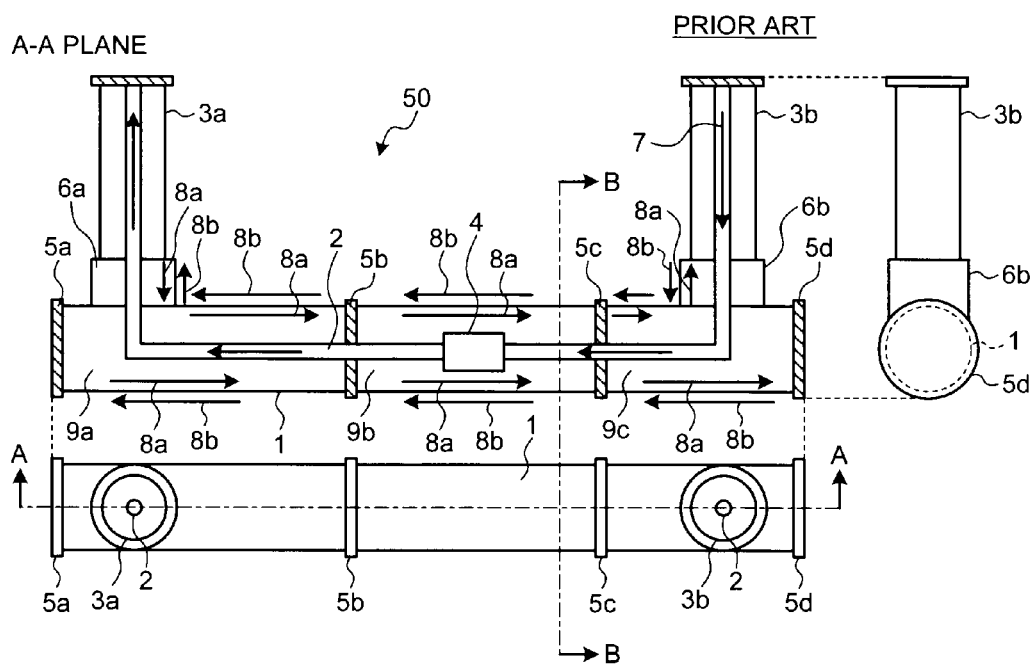
FIG. 1 is a drawing of an exemplary configuration of conventional gas insulated switchgear.

1 Pressure container
2 Main bus
3a, 3b Bushing
4 Circuit breaking unit
5a, 5b, 5c, 5d Flange
6a, 6b Branching pipe
7 Load current
8a, 8b Eddy current
9a, 9b, 9c Container
10, 10a, 10b, 11a, 11b Electrically-conductive member (conductive member)
12 Fin
13 Bolt
14a, 14b, 14c Current return path
15a, 15b Eddy current
16, 16a, 16b, 16c Attachment seat
17a, 17b Adaptor
18 Flange
30, 50 Gas insulated switchgear

BEST MODE(S) FOR CARRYING OUT THE INVENTION

In the following sections, exemplary embodiments of gas insulated switchgear according to the present invention will be explained in detail, with reference to the drawings. The present invention is not limited to the exemplary embodiments.

First Embodiment

FIG. 1 is a drawing of an exemplary configuration of conventional gas insulated switchgear. In FIG. 1, a configuration of gas insulated switchgear 50 is presented by providing the following three drawings next to one another: a cross-sectional view (at the line A-A); a top view (that is provided below the cross-sectional view); and a lateral view (that is provided on the right-hand side of the cross-sectional view). As shown in FIG. 1, for example, the gas insulated switchgear 50 is constituted so as to include: a pressure container 1 that is configured by using a magnetic material; a main bus 2 through which a load current flows; bushings 3a and 3b; a circuit breaking unit 4; flanges 5a to 5d; and branching pipes 6a and 6b that connect the pressure container 1 and the bushings 3a, 3b, respectively.

The pressure container 1 is positioned in such a manner that the longer-axis direction thereof extends horizontally. For example, the pressure container 1 is configured by connecting together containers 9a, 9b, and 9c each of which has a circular cylindrical shape and has a flange portion on at least one end thereof. In other words, the container 9a and the container 9b are connected to each other by the flange 5b, whereas the container 9b and the container 9c are connected to each other by the flange 5c. Further, on the inside of each of the containers 9a, 9b, and 9c, an independent pressure space with which gas separation from the other spaces is achieved, is formed. Also, the containers 9a and 9c have the branching pipes 6a and 6b, respectively.

On the inside of the pressure container 1, the circuit breaking unit 4 and the main bus connected to the circuit breaking unit 4 are housed. The main bus 2 is supported in an electrically-insulated manner by electrically-insulating spacers (not shown) that are attached to the flanges 5b and 5c. The main bus 2 is provided so as to extend along the axial direction of the pressure container 1 and is further drawn out of the pressure container 1 via the branching pipes 6a and 6b. The bushings 3a and 3b are connected to the branching pipes 6a and 6b, respectively.

In FIG. 1, when a load current 7 flows through the main bus 2, the pressure container 1 has eddy currents 8a and 8b that are induced in such a manner that a magnetic field generated by the load current 7 is to be cancelled. More specifically, the eddy current 8a flows on the internal wall surface side of the pressure container 1, whereas the eddy current 8b flows on the external wall surface side of the pressure container 1. In this situation, the internal wall surface is the wall surface of the pressure container 1 positioned on the inside thereof, whereas the external wall surface is the wall surface of the pressure container 1 positioned on the outside thereof. Due to Joule heating caused by the eddy currents 8a and 8b, the temperature of the pressure container 1 becomes higher. In addition, as shown in FIG. 1, the eddy currents 8a and 8b also occur in the branching pipes 6a and 6b. It should be noted that, in FIG. 1, the thickness of the pressure container 1 is not shown in the cross-sectional view at the line A-A, to simplify the drawing.

Figure 2:
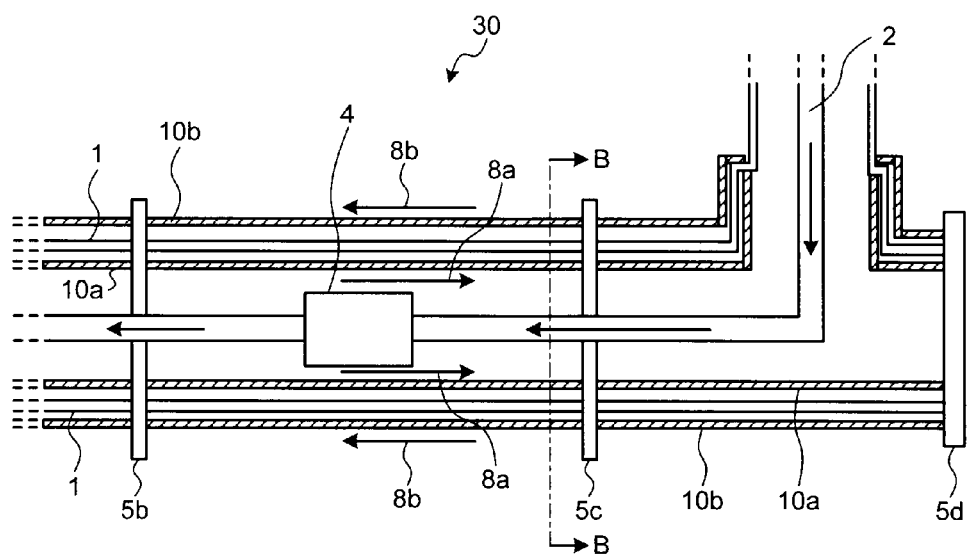
FIG. 2 is an enlarged cross-sectional view of a relevant part of gas insulated switchgear according to a first embodiment of the present invention.

FIG. 2 is an enlarged cross-sectional view of a relevant part of the gas insulated switchgear according to a first embodiment of the present invention. Some of the constituent elements that are the same as those shown in FIG. 1 are referred to by using the same reference characters. In FIG. 2, a gas insulated switchgear 30 is provided with, in addition to the configuration shown in FIG. 1, electrically-conductive members (hereinafter, "conductive members") 10a and 10b each of which is made of, for example, a material that is non-magnetic and has higher electric conductivity than that of the material of which the pressure container 1 is made; and each of which is provided so as to be positioned apart from the wall surfaces of the pressure container 1, and so as to be positioned along the wall surfaces of the pressure container 1 and along the direction in which the main bus 2 extends.

Each of the conductive members 10a is provided on the inside of the pressure container 1 and is provided so as to be positioned apart from the internal wall surface of the pressure container 1 (i.e., so as to be distant from the internal wall surface without being in contact with the internal wall surface); and so as to be positioned along the internal wall surface of the pressure container 1 and along the direction in which the main bus 2 extends. Similarly, each of the conductive members 10b is provided on the outside of the pressure container 1; and is provided so as to be positioned apart from the external wall surface of the pressure container 1 (i.e., so as to be distant from the external wall surface without being in contact with the external wall surface); and so as to be positioned along the external wall surface of the pressure container 1 and along the direction in which the main bus 2 extends.

Each of the conductive members 10a and 10b is attached to the pressure container 1 via the flanges 5a to 5d. Accordingly, each of the conductive members 10a and 10b is attached to the pressure container 1 via the flanges 5a to 5d. Further, as explained later, the ends of the conductive members 10a and 10b that are provided so as to extend up to the branching pipes 6a and 6b are attached to the branching pipes 6a and 6b by using bolts made of metal, for example.

Because each of the conductive members 10a and 10b is attached to the flanges 5a to 5d; current return paths through each of which or in which an electric current is able to flow via the flanges 5a to 5d, are formed. Similarly, also in the case where each of the conductive members 10a and 10b is attached to the pressure container 1 by using bolts made of metal, for example (e.g., in the case where each of the conductive members 10a and 10b is connected to the branching pipes 6a and 6b), current return paths through each of which an electric current is able to flow via the bolts and the pressure container 1, are formed.

FIGS. 3A and 3B are a cross-sectional view at the line B-B shown in FIG. 1 and a cross-sectional view at the line A-A' shown in FIG. 3A. In other words, a transverse cross-sectional view (i.e., a cross-sectional view at the line B-B) of the pressure container 1 (i.e., FIG. 3A) and a cross-sectional view at the line A-A' shown in FIG. 3A (i.e., FIG. 3B) are presented next to each other. When the load current 7 flows through the main bus 2, the eddy currents 8a and 8b flow on the internal surface and on the external surface of the pressure container, respectively.

FIGS. 4A and 4B are drawings of an example in which the conductive members 10a and 10b are provided on the inside and on the outside of the pressure container 1 shown in FIGS. 3A and 3B, showing of an example of a cross-sectional view at the line B-B shown in FIG. 2. As shown in FIGS. 4A and 4B, the conductive members 10a are configured with a plurality of members that are positioned so as to be equally apart with one another, along the circumferential direction of the pressure container 1. More specifically, the conductive members 10a are configured with, for example, eight members and are attached so as to extend through the flange 5c. Also, as shown in FIGS. 2 and 4, each of the conductive members 10a is shaped like a bar, for example. Similarly, the conductive members 10b are configured with the same number of members that are positioned so as to be equally apart with one another, along the circumferential direction of the pressure container 1. The conductive members 10b are attached so as to extend through the flange 5c. Also, each of the conductive members 10b is shaped like a bar, for example. Incidentally, each of the conductive members 10a and 10b may be configured with a covered conducting wire. Further, the conductive members 10b are positioned in such a manner that the center of each of the conductive members 10b in a cross section is positioned on a straight line extended from the center of the main bus 2 in the cross section to the center of a corresponding one of the conductive members 10a in the cross section. In other words, the conductive members 10a and the conductive members 10b form eight pairs along the circumferential direction of the wall surface of the pressure container 1 while the wall surface is interposed between the two members of each pair; so that the eight pairs are positioned at regular intervals or so that the eight pairs are positioned radially while using the main bus 2 as the center.

Each of the conductive members 10a and 10b is made of a non-magnetic material and has higher electric conductivity than that of the pressure container 1. Because the conductive members 10a and 10b having higher electric conductivity than that of the pressure container 1 are provided, some of the eddy currents 8a and 8b that used to flow on the pressure container 1 now flow through the conductive members 10a and 10b. It is not that all of the eddy currents 8a and 8b flow through the conductive members 10a and 10b, but the eddy currents 8a and 8b are divided so as to flow on both the pressure container 1 and the conductive members 10a, 10b, according to the ratio between the flow path resistance of the pressure container 1 for the eddy currents and the resistance of the conductive members 10a, 10b. For example, in the case where the ratio between the flow path resistance of the pressure container 1 and the resistance of the conductive members 10a, 10b is 9 (the pressure container) to 1 (the conductive members), the eddy currents flowing on the pressure container 1 is one tenth of the eddy currents that would flow on the pressure container 1 if the conductive members 10a and 10b were not provided. With regard to the increase in the temperature of the pressure container 1, because the Joule heating is calculated by using a formula $I^2R$, the term with the electric current is squared, and it is therefore effective. Accordingly, when the eddy currents 8a and 8b become one tenth of the previous eddy currents, the amount of heat generation becomes one hundredth of the previous heat generation amount. As explained here, to reduce the amount of heat generation of the pressure container 1, it is effective to have an arrangement in which the eddy currents 8a and 8b do not flow on the pressure container 1. Further, although the eddy currents 8a and 8b also flow through the conductive members 10a and 10b in the proportion described above; because, for example, the conductive members 10a and 10b are configured by using a non-magnetic material and are the members that have higher electric conductivity than that of the pressure container 1, even if the eddy currents 8a and 8b are caused to flow through the conductive members 10a and 10b, it is possible to reduce the amount of heat generation of the conductive members 10a and 10b. For example, in the case where the conductive members 10a and 10b are configured by using a material having the electric conductivity that is five times higher than that of the pressure container 1, the amount of heat generation becomes one fifth. Further, in the case where the conductive members 10a and 10b are configured by using a non-magnetic material, the skin depth of the position where the eddy currents flow is very much larger than in the case where the conductive members 10a and 10b are configured by using a magnetic material. The skin depth can be calculated by using the formula shown below:

$$\text{skin depth } \delta = \sqrt{(2\rho/2\pi f \mu \mu_0)}$$

In this formula, $\rho$ denotes the specific resistance, f denotes the frequency, and $\mu$ denotes the magnetic permeability, while $\mu_0$ denotes the magnetic permeability in vacuum. When a non-magnetic material is used, the value of $\mu$ in the denominator becomes smaller, and the skin depth therefore becomes larger. Because the cross-section area of a flow path of the eddy currents is proportional to the skin depth, when the skin depth becomes five times larger, the cross-section area of the flow of the eddy currents also becomes five times larger, and the resistance of the conductive members becomes one fifth. In the case where the conductive members 10a and 10b are configured by using a non-magnetic material and have higher electric conductivity, the resistance value becomes one twenty-fifth (1/25), in combination with the result achieved with the electric conductivity. It is therefore possible to reduce the amount of heat generation of the conductive members 10a and 10b. Consequently, by configuring the conductive members 10a and 10b that are provided with the pressure container 1 by using a material that is non-magnetic and has higher electric conductivity than that of the pressure container 1; it is possible to reduce the amount of heat generation of the pressure container 1, and also, it is possible to reduce the amount of heat generation of the conductive members 10a and 10b.

In the case where the conductive members 10b are provided on the outside of the pressure container 1, it is necessary, as described above, to limit the increase in the temperature of the conductive members 10b to the extent that no problem is caused even if someone touches the conductive members 10b. Thus, it is necessary to keep the amounts of heat generation of both the pressure container 1 and the conductive members 10b small.

Further, in the case where the increase in the temperature of the conductive members 10b is large, it is a good idea to arrange the cross-section area of each of the conductive members 10b to be large. It should be noted, however, that when the cross-section area is arranged to be large, the dimension in the width direction should be arranged to be large, because no effect is achieved by arranging the dimension in the depth direction of the flows of the eddy currents to be larger than the skin depth.

By configuring the pressure container 1, which is positioned so as to oppose the conductive members 10a and 10b, by including a magnetic material, it is possible to effectively inhibit the increase in the temperature. In the case where the pressure container 1, which is positioned so as to oppose the conductive members 10a and 10b, is configured by using a non-magnetic material, because the eddy currents 8a and 8b that flow on the surfaces of the pressure container 1 are smaller, the effect of reducing the amount of heat generation is also smaller.

Further, in the case where the conductive members 10a and 10b are provided either on the inside or on the outside of the pressure container 1, it is possible to reduce the amount of heat generation only by 50% at maximum. For example, in the case where the conductive members 10b are provided only on the outside of the pressure container 1, only the eddy currents 8b flowing on the external surface of the pressure container 1 are caused to flow through the conductive members 10b. In that situation, Joule heating caused by the eddy currents 8a flowing on the internal surface does not change. As a result, because it is possible to reduce only the Joule heating caused by the eddy currents 8b flowing on the external surface, it is possible to reduce the amount of heat generation of the pressure container 1 only by 50% at maximum. Consequently, by providing the conductive members 10a and 10b both on the inside and on the outside of the pressure container 1, it is possible to reduce the amount of heat generation efficiently.

Figure 5:
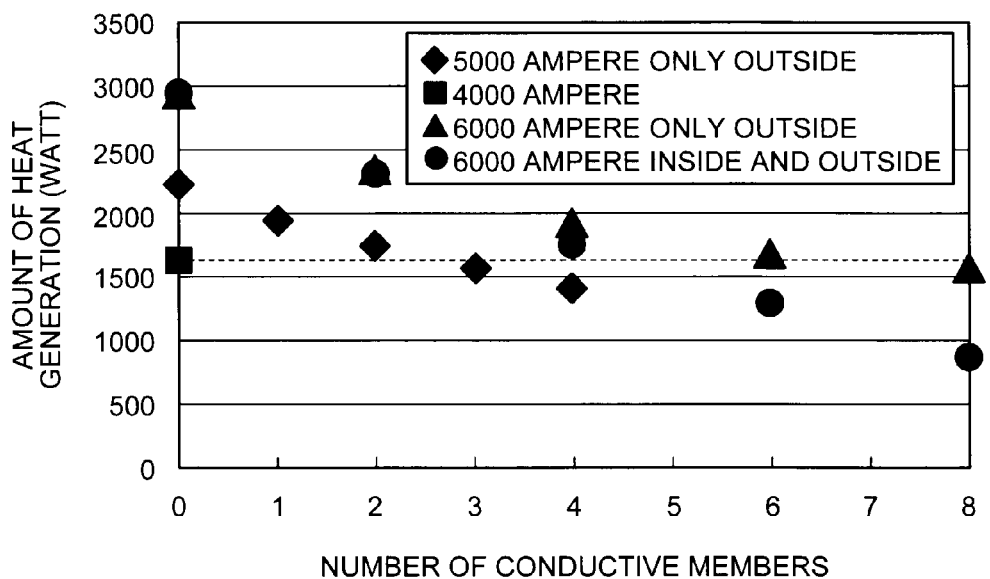
FIG. 5 is a chart for explaining a relationship between the numbers of electrically-conductive members being provided and amounts of heat generation of a pressure container, in the situation where the exterior dimension of the pressure container is fixed, while the load current value is set to 4000 amperes, 5000 amperes, or 6000 amperes.

In FIG. 5, the number of conductive members being provided and the amount of heat generation of the pressure container 1 are shown in correspondence with the situation where the exterior dimension of the pressure container 1 is fixed, while the load current value is set to 4000 amperes, 5000 amperes, or 6000 amperes. First, a comparison will be made while the number of conductive members expressed on the horizontal axis shown in FIG. 5 is "0". On an assumption that a load current value of 4000 amperes corresponds to an amount of heat generation that allows the pressure container 1 made of a magnetic material to be used, the amount of heat generation is 1.6 times larger [i.e., $(5000 \text{ A}/4000 \text{ A})^2$] when the load current value is 5000 amperes, whereas the amount of heat generation is 2.3 times larger [i.e., $(6000 \text{ A}/4000 \text{ A})^2$] when the load current value is 6000 amperes. To use the pressure container 1 that is made of a magnetic material and corresponds to a load current value of 4000 amperes; it will be possible to use 5000 amperes in terms of the heat by providing three conductive members only on the outside, and thereby inhibiting the amount of heat generation so as to be equal to the amount of heat generation corresponding to a load current value of 4000 amperes. In other words, it is possible to use the pressure container 1 that is made of a magnetic material and corresponds to a load current value of 4000 amperes, even with the load current of 5000 amperes. For the 6000 amperes of the load current, it is necessary to use eight conductive members in the case where the conductive members are provided only on the outside; however, in the case where the conductive members are provided both on the inside and on the outside, it is possible to use a pressure container made of a magnetic material even with the load current of 6000 amperes, by providing 5 to 6 conductive members. The effect of reducing the amount of heat generation achieved by using the conductive members is larger when the conductive members are provided both on the inside and on the outside than when the conductive members are provided only on the outside or only on the inside. Thus, when the conductive members are provided both on the inside and on the outside, it is possible to reduce the amount of heat generation to a targeted level with a smaller number of conductive members.

Figure 6:
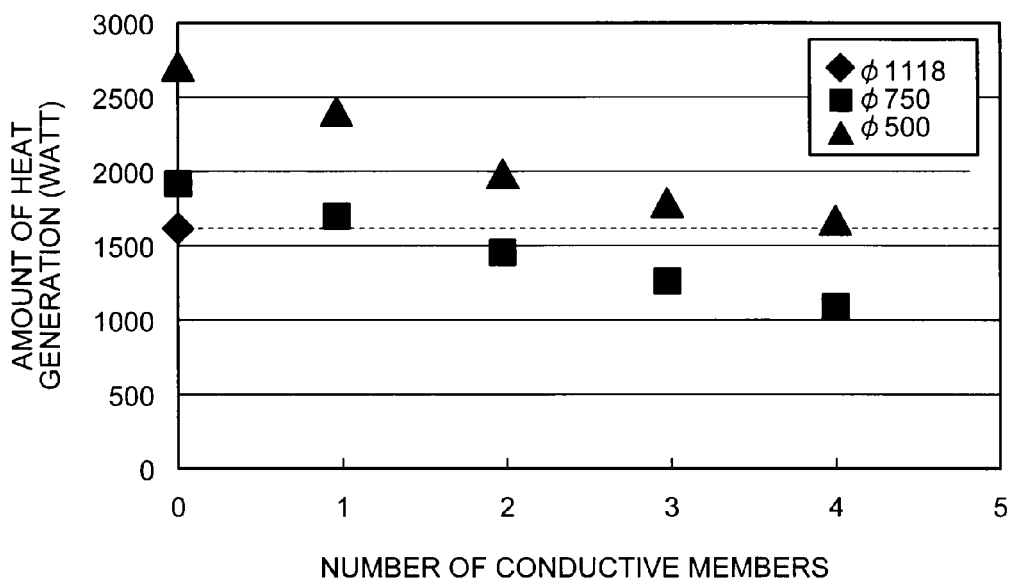
FIG. 6 is a chart for explaining a relationship between the numbers of electrically-conductive members being provided and amounts of heat generation of a pressure container, in the situation where the load current is fixed, while the diameter y of the pressure container is set to 1118 millimeters, 750 millimeters, or 500 millimeters.

In FIG. 6, the number of conductive members being provided and the amount of heat generation of the pressure container 1 are shown in correspondence with the situation where the load current value is fixed, while the diameter φ of the pressure container is set to 1118 millimeters, 750 millimeters, or 500 millimeters. On an assumption that a diameter φ of 1118 millimeters corresponds to an amount of heat generation that allows the pressure container 1 made of a magnetic material to be used, it is possible to achieve an amount of heat generation that is equal to the amount of heat generation corresponding to the diameter φ of 1118 millimeters; by providing two conductive members on the outside when the diameter φ is 750 millimeters, or by providing four conductive members on the outside when the diameter φ is 500 millimeters. In other words, by providing the conductive members, it becomes possible to use the pressure container 1 made of a magnetic material that has a smaller size. As explained here, it is possible to select the optimal number of conductive members 10a and 10b, according to the load current value or the outside diameter of the pressure container 1. Further, even if the temperature rises to a level that is higher than a predetermined value, it is possible to inhibit the increase in the temperature only by installing by add the conductive members 10a and 10b. Further, because it is possible to use the conductive members 10a and 10b that are uniform, without the need to vary the dimensions thereof; there is no need to design the conductive members every time the load current value or the diameter of the pressure container changes. Because the examples shown in FIGS. 5 and 6 correspond to the situations where the cross-section area of each of the conductive members is fixed, it should be noted that the number of conductive members that should be provided will be different, if the cross-section area is different.

Different examples of positional arrangements of the conductive members are shown in FIGS. 7 to 10. In the example shown in FIG. 7, the conductive members provided on the inside of the pressure container 1 and the conductive members provided on the outside of the pressure container 1 are positioned in an alternating manner. In the example shown in FIG. 8, the conductive members are provided only on the outside. In the example shown in FIG. 9, the conductive members are provided only on the inside. In the example shown in FIG. 10, the conductive members are provided in the lower part.

Figure 7:
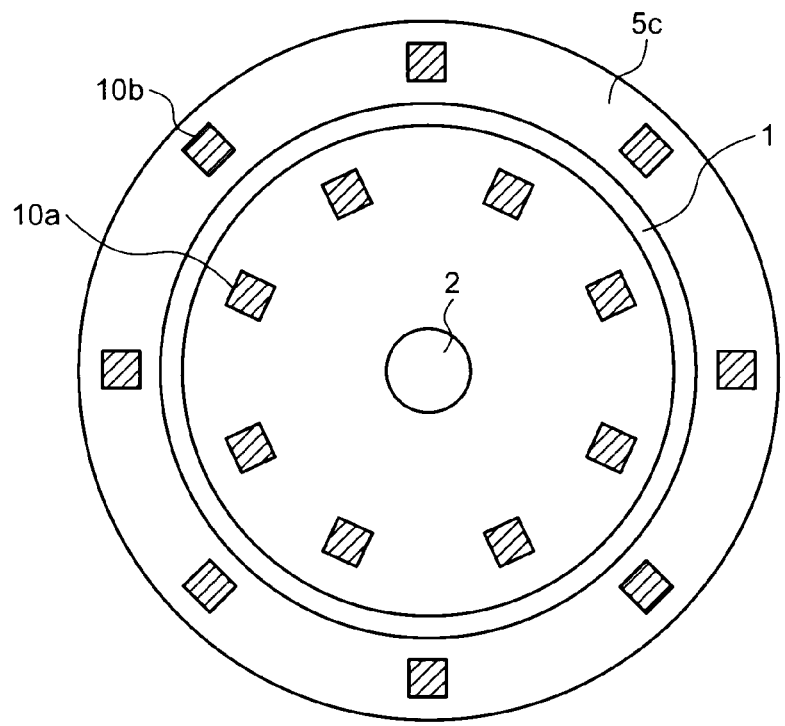
FIG. 7 is another example of a cross-sectional view at the line B-B shown in FIG. 2.

In the example shown in FIG. 7, the conductive members 10a are configured with, for example, eight members that are positioned so as to be equally apart with one another, along the circumferential direction of the pressure container 1. Similarly, the conductive members 10b are configured with the same number of members that are positioned so as to be equally apart with one another, along the circumferential direction of the pressure container 1. Each of the conductive members is shaped like a bar, for example. Further, the conductive members 10a and the conductive members 10b are positioned in an alternating manner, along the circumferential direction of the wall surface of the pressure container 1.

Figure 8:
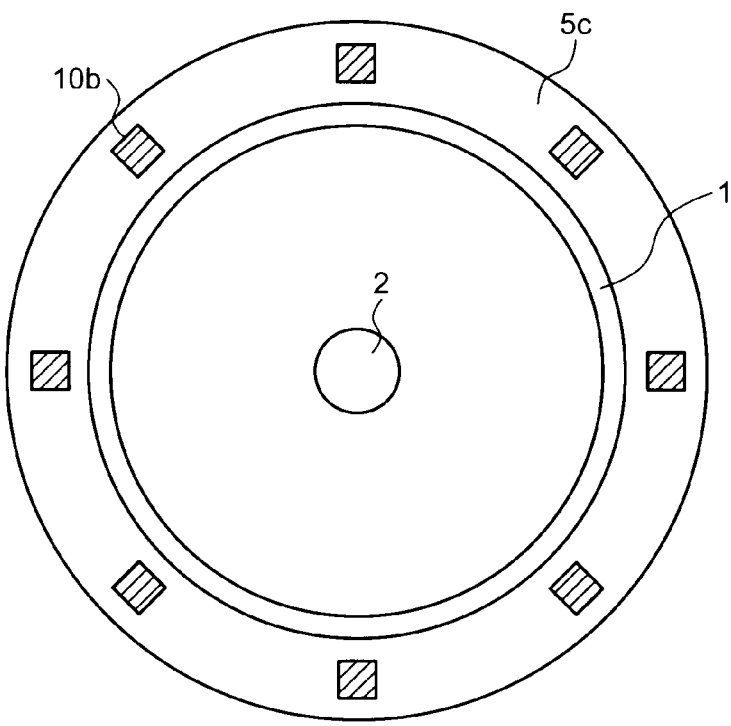
FIG. 8 is a drawing of an exemplary configuration in which electrically-conductive members are provided only on the outside of a pressure container.
Figure 9:
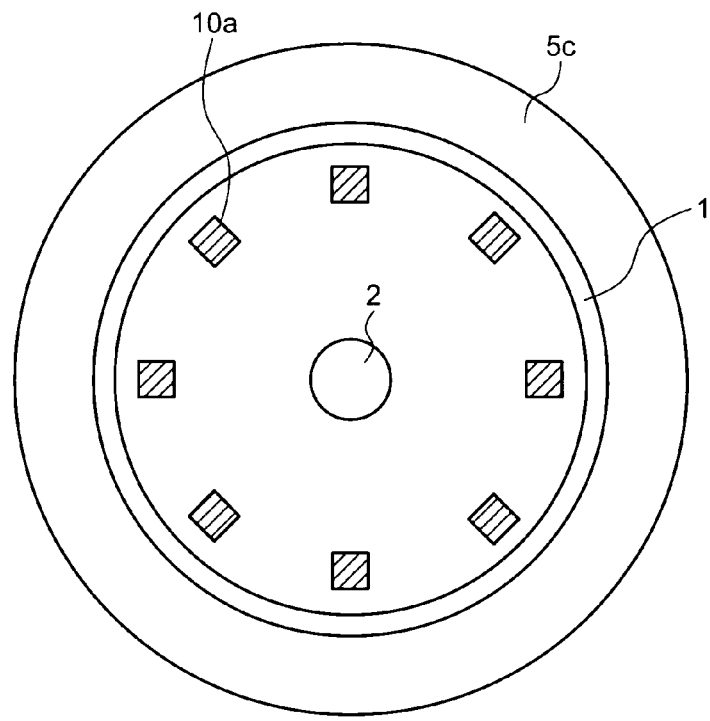
FIG. 9 is a drawing of an exemplary configuration in which electrically-conductive members are provided only on the inside of a pressure container.

In the example shown in FIG. 8, the conductive members 10b are provided only on the outside of the pressure container 1, so that the conductive members 10b are positioned so as to be equally apart with one another along the outer circumference of the pressure container 1. In the example shown in FIG. 9, the conductive members 10a are provided only on the inside of the pressure container 1, so that the conductive members 10a are positioned so as to be equally apart with one another along the inner circumference of the pressure container 1.

In the example shown in FIG. 7, it is possible to achieve the same effect of inhibiting the heat generation as in the example shown in FIGS. 4A and 4B. In the example shown in FIG. 8, because the conductive members 10b are provided only on the outside, the effect of inhibiting the heat generation is 50% at maximum with respect to the situation where the conductive members 10b are not provided; however, because the conductive members 10b are provided on the outside of the pressure container 1, it is possible to ignore the issue related to the electric insulation from the main bus 2. Further, because the conductive members 10b are provided on the outside, it is possible to easily remove the conductive members 10b, and it is also possible to install by adding the conductive members 10b later. In the example shown in FIG. 9, because the conductive members 10a are provided only on the inside, the effect of inhibiting the heat generation is 50% at maximum, which is the same as in the example shown in FIG. 8. Because the conductive members 10a are provided on the inside, the electric insulation from the main bus 2 needs to be taken into consideration; however, because the conductive members 10a are housed in the pressure container 1, there is no possibility that someone touches the conductive members 10a during an inspection process or the like. In addition, because a high-pressure gas is enclosed in the pressure container 1, the effect of releasing the heat into the gas is larger than in the situation where the conductive members are provided on the outside.

Figure 10:
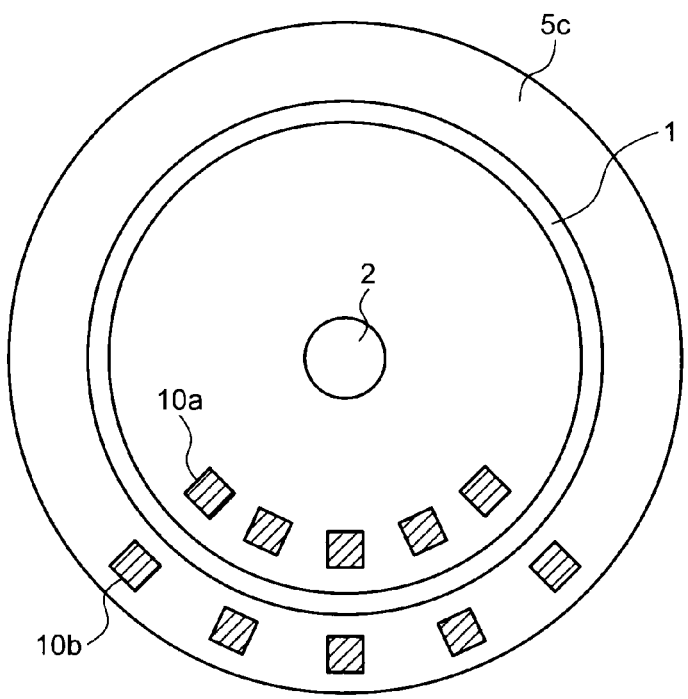
FIG. 10 is a drawing of an exemplary configuration in which electrically-conductive members are provided in the lower part of a pressure container.

In the example shown in FIG. 10, the conductive members 10a and 10b are provided on the inside and on the outside in such a manner that the conductive members 10a and 10b are concentrated in the lower part. The effect of inhibiting the heat generation is larger than in the situation where the conductive members are provided only on the inside or only on the outside; however, because the conductive members are not positioned so as to be equally apart with one another, unlike the examples shown in FIGS. 7 and 8, the effect of inhibiting the heat generation is smaller than in the examples shown in FIGS. 7 and 8. As for the eddy currents flowing on the pressure container 1, because the eddy currents flow while being equally apart with one another in terms of the circumferential direction of the pressure container 1; so the effect of reducing the amount of heat generation is larger when the conductive members are positioned so as to be equally apart with one another along the circumferential direction. Further, although the conductive members are provided so as to be concentrated in the lower part in the example shown in FIG. 10, the positions of the conductive members are not limited to the lower part. The example illustrates an application in which it is not possible to physically position the conductive members so as to be equally apart with one another.

No matter whether the conductive members 10a and 10b are provided so as to be in close contact with the pressure container 1 or so as to be distant from the pressure container 1, the effect of reducing the amount of heat generation of the pressure container 1 is the same. However, in the case where the conductive members 10a and 10b are provided so as to be distant from the pressure container 1, the heat releasing effect of the conductive members 10a and 10b that is achieved by natural convections, is larger.

In the examples shown in FIGS. 7 to 10, another arrangement is acceptable in which the conductive members 10a and the conductive members 10b are each configured as an integrally-formed member. For example, it is acceptable to configure the conductive members 10a and the conductive members 10b each as a conductor that has a cylindrical shape and has an annular cross section. Alternatively, yet another arrangement is acceptable in which each of the conductive members 10a and 10b is configured by using a conducting wire.

Figure 11:
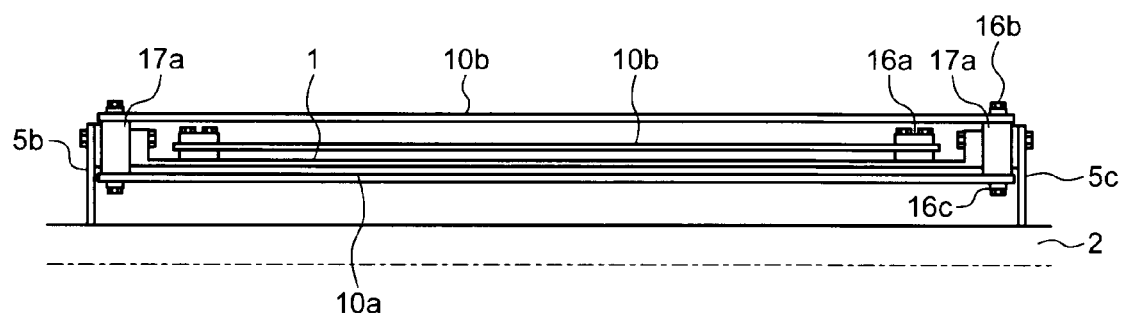
FIG. 11 is a drawing of an example of a method for attaching electrically-conductive members.

A specific method for attaching the conductive members is shown in FIG. 11. In FIG. 11, only the portion with the container 9b in FIG. 1 is shown. The drawing is symmetric with respect to the main bus 2. The conductive members 10a and 10b are attached via attachment seats 16a that are obtained by partly borrowing grounding seats for the pressure container 1 or via attachment seats 16b and 16c for the flanges 5b and 5c. The reference characters 17a and 17b represent adapters. Because the existing grounding seats are borrowed for the use as the attachment parts, it is possible to provide the conductive members 10a and 10b without the need to install new attachment seats, depending on how many conductive members 10a and 10b are to be provided. According to the method for attaching the conductive members 10a and 10b to the pressure container 1 described above, the conductive members 10a and 10b are fixed onto the grounding seats 16a and the attachment seats 16b and 16c for the flanges, as shown in FIG. 11, for example. Further, another arrangement is acceptable in which the conductive members 10a and 10b are directly disposed on the pressure container 1 by performing a brazing process or the like. According to the first embodiment, the drawings depict the examples in which the conductive members 10a and 10b are directly attached onto the flanges 5a to 5d, for the purpose of explaining the flows of the eddy currents and the like in an easy-to-understand manner.

As explained above, according to the first embodiment, the conductive members 10a and/or the conductive members 10b each of which has higher electric conductivity than the electric conductivity of the material of which the pressure container 1 is made, are provided; so as to cause the eddy currents that occur when an electric current flows through the main bus 2, to flow through the conductive members 10a and/or the conductive members 10b via the flanges 5a to 5d and the like. As a result, an advantageous effect is achieved where it is possible to inhibit the eddy currents from flowing on the pressure container 1 and to inhibit the increase in the temperature of the pressure container 1.

Further, it is possible to form the current return paths for the eddy currents by using the simple structure that is obtained by, for example, short-circuiting between the conductive members 10a and the conductive members 10b via the flanges 5a to 5d and the like. As a result, it is possible to inhibit the heat generation of the pressure container 1 at a low cost. Incidentally, the advantageous effect of each of the individual specific examples is already explained above.

Second Embodiment

FIGS. 12A and 12B are drawings of gas insulated switchgear according to a second embodiment of the present invention. FIG. 12A is a transverse cross-sectional view, whereas FIG. 12B is a lengthwise cross-sectional view. FIG. 12A is a cross-sectional view at the line B-B shown in FIG. 2, whereas FIG. 12B is a cross-sectional view at the line A-A' shown in FIG. 12A.

As shown in FIGS. 12A and 12B, according to the second embodiment, a conductive member 11a that is O-shaped (i.e., annular-shaped) and has higher electric conductivity than that of the flange 5c, is provided between the flange 5c and the ends of the conductive members 10a, whereas a conductive member 11b that is, for example, O-shaped (i.e., annular-shaped) and has higher electric conductivity than that of the flange 5c is provided between the flange 5c and the ends of the conductive members 10b. Further, the conductive members 10a are attached to the flange 5c, via the conductive member 11a fixed onto the flange 5c. Also, the conductive members 10b are attached to the flange 5c, via the conductive member 1ib fixed onto the flange 5c. Each of the other flanges 5a, 5b, and 5d also has the same configuration. In FIGS. 12A and 12B, some of the constituent elements that are the same as those in the first embodiment are referred to by using the same reference characters.

According to the first embodiment, the eddy currents flow on the surfaces of the flanges 5a to 5d at interfaces between the conductive members 10a, 10b and the flanges 5a to 5d. In contrast, according to the second embodiment, the eddy currents flow into the conductive members 11a and 11b having the higher electric conductivity. As a result, the flow path resistance for the eddy currents become further smaller, and it is possible to collect more of the eddy currents in the surroundings of the conductive members 10a and 10b, into the conductive members 10a and 10b. Consequently, the effect of inhibiting the heat generation is even larger. Other advantageous effects of the second embodiment are the same as those according to the first embodiment. In the example shown in FIGS. 12A and 12B, the positional arrangement, the shapes, and the like of the conductive members 10a and 10b are the same as in the example shown in FIGS. 4A and 4B; however, the second embodiment is not limited to this example. It is possible to apply the second embodiment to other situations.

Third Embodiment

FIGS. 13A and 13B are drawings of gas insulated switchgear according to a third embodiment of the present invention. FIG. 13A is a transverse cross-sectional view, whereas FIG. 13B is a lengthwise cross-sectional view. FIG. 13A is a cross-sectional view at the line B-B shown in FIG. 2, whereas FIG. 13B is a cross-sectional view at the line A-A' shown in FIG. 13A. In FIGS. 13A and 13B, some of the constituent elements that are the same as those in the first embodiment are referred to by using the same reference characters.

As shown in FIGS. 13A and 13B, according to the third embodiment, fins 12 that are used for releasing heat are attached onto the surface of the conductive members 10b that are provided on the outside of the pressure container 1. As a result, the conductive members 10b have the functions of both inhibiting the heat generation and accelerating the release of the heat. In the example shown in FIGS. 13A and 13B, the fins 12 are attached onto the surface of the conductive members 10b positioned on the opposite side to the pressure container 1, and are provided at predetermined intervals along the lengthwise direction of the conductive members 10b.

Generally speaking, conductive members having high electric conductivity also have high thermal conductivity. Thus, by attaching the fins 12 that are used for releasing heat, to the conductive members 10b having high electric conductivity, it is possible to release the heat efficiently. Alternatively, it is also possible to effectively release the heat by providing a coating having high emissivity or radiation ratio on the surface of the conductive members 10b.

In FIG. 13B, the manner in which a heat flow travels from the conductive member 10a to the conductive member 10b via the flange 5c, is shown. By arranging the cross-sectional area of each of the heat flow paths of the conductive members 10a and 10b to be large, it is possible to cause the heat in the conductive members 10a to flow into the conductive member 10b, and it is possible to release the heat efficiently by using the fins 12.

Further, another arrangement is acceptable in which the fins 12 are attached to the conductive members 10a that are provided on the inside of the pressure container 1. However, because the fins 12 are not in contact with air flows on the outside, the effect of releasing the heat is smaller than in the example in which the fins 12 are attached to the conductive members 10b. Also, in the case where the fins 12 are provided on the inside of the pressure container 1, it is effective to provide the fins 12 in the surroundings of the branching pipes 6a and 6b that are shown in FIG. 1.

Other configurations, other operations, and other advantageous effects of the third embodiment are the same as those according to the first and the second embodiments. It is possible to similarly apply the third embodiment to situations other than the exemplary configuration of the conductive members 10a and 10b shown in FIGS. 13A and 13B.

Fourth Embodiment

Figure 14A:
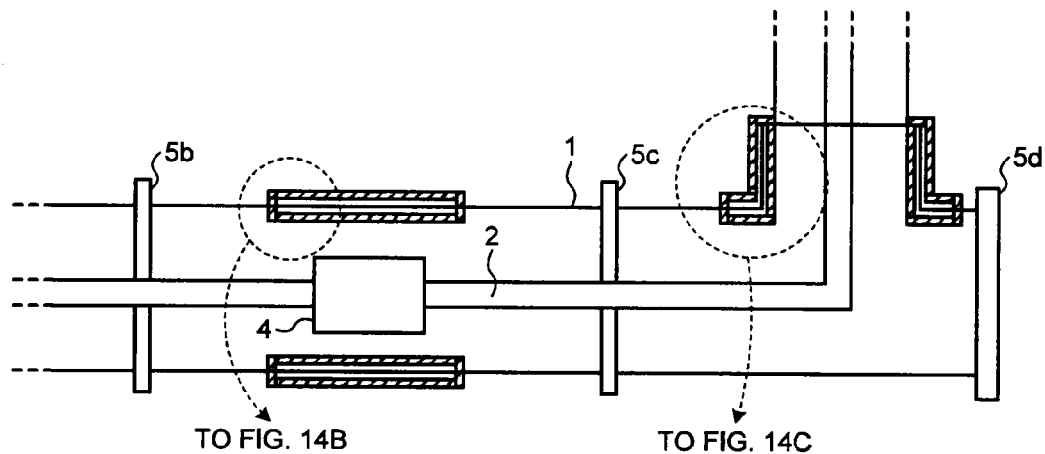
FIGS. 14A, 14B, and 14C are cross-sectional views of exemplary configurations of relevant parts of gas insulated switchgear according to a fourth embodiment of the present invention.
Figure 14B:
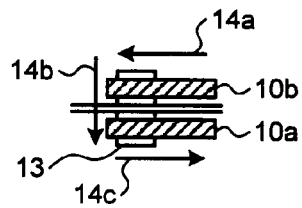
Figure 14C:
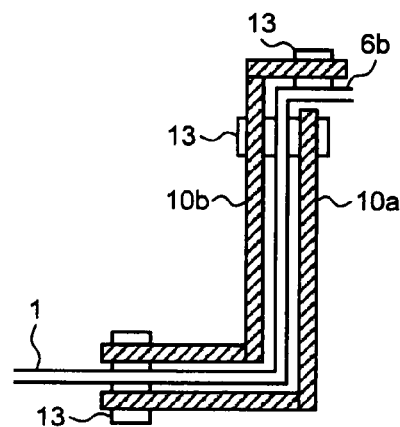

FIGS. 14A, 14B, and 14C are cross-sectional views of exemplary configurations of relevant parts of gas insulated switchgear according to a fourth embodiment of the present invention. In FIG. 14A, an example is shown in which conductive members are disposed so as to be locally present in the pressure container 1. FIG. 14B is an enlarged view of an example in which, within FIG. 14A, the conductive members 10a and 10b are disposed so as to be locally present in the surrounding of the circuit breaking unit 4. FIG. 14C is an enlarged view of an example in which, within FIG. 14A, the conductive members 10a and 10b are disposed so as to be locally present in the surroundings of the branching pipe portions. In FIGS. 14A, 14B, and 14C, some of the constituent elements that are the same as those in the first embodiment are referred to by using the same reference characters.

As shown in FIGS. 14A, 14B, and 14C, according to the fourth embodiment, the conductive members 10a and 10b are disposed in the portions that locally generate heat. In other words, because the circuit breaking unit 4 and the branching pipes 6a and 6b are likely to generate heat locally in the gas insulated switchgear, the conductive members 10a and 10b are not disposed throughout the entirety of the pressure container 1, but are disposed so as to be present in certain parts, while using the locations in which the circuit breaking unit 4 and the branching pipes 6a and 6b are provided, as the centers. As a result, it is possible to effectively inhibit the heat generation and to reduce the number of conductive members 10a and 10b that are used. The conductive members 10a and 10b are attached to the wall surfaces of the pressure container 1 by using bolts 13 that are made of metal.

As shown in FIGS. 14A and 14B, the load current flows in the outer circumferential portion of the circuit breaking unit 4, and because the distance from the pressure container 1 is shorter, the amount of heat generation caused by the eddy currents is larger than in the other portions where only the main bus 2 is present. Accordingly, by disposing the conductive members 10a and 10b in the surrounding of the circuit breaking unit 4, it is possible to inhibit the increase in the temperature.

As shown in FIGS. 14A and 14C, in the branching pipe portions, because magnetic fluxes from two directions, i.e., both the direction of the main bus 2 extending in the horizontal direction and the direction of the main bus 2 that is drawn vertically, have a linkage, the amount of heat generation is large. Accordingly, by disposing the conductive members 10a and 10b in the surroundings of the branching pipe portions, it is possible to inhibit the increase in the temperature.

Further, according to the fourth embodiment, because the conductive members 10a and 10b are disposed so as to be locally present, a current return path that extends 14a→14b→14c is formed via the wall surfaces of the pressure container 1 (and the bolt 13). Consequently, there is no need to attach the conductive members 10a and 10b to the flanges 5a to 5d, unlike in the examples according to the first through the third embodiments. It is therefore possible to have flexibility in the positional arrangements of the conductive members 10a and 10b.

Further, it is possible to install by adding the conductive members 10b provided on the outside of the pressure container 1 later. Thus, in the case where it is not possible to inhibit the temperature of the pressure container 1 to a predetermined level, it is possible to install by adding the conductive members 10b so as to lower the temperature of the pressure container 1 to the predetermined level. Further, to bring the conductive members 10a and 10b into electric contact with the pressure container 1, it is desirable to configure the bolts 13 that are used for fixing the conductive members 10a and 10b, by using a material that has high electric conductivity. For example, it is desirable if the electric conductivity of the bolts 13 is higher than the electric conductivity of the pressure container 1.

Figure 15:
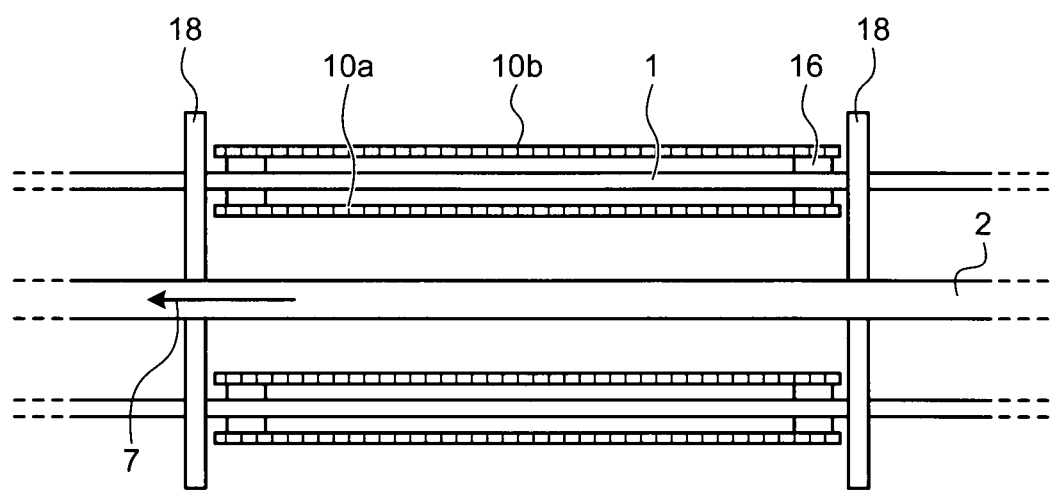
FIG. 15 is a cross-sectional view of another exemplary configuration of a relevant part of the gas insulated switchgear according to the fourth embodiment.

FIG. 15 is a cross-sectional view of another exemplary configuration of a relevant part of the gas insulated switchgear according to the fourth embodiment. In the present example, the pressure container 1 is provided with the conductive members 10a and 10b, while the pressure container 1 is defined by flanges 18 each of which is configured by using only an electrically-insulating substance. In the case where both ends of the pressure container 1 are configured with the flanges 18 each of which is made of the electrically-insulating substance, it is not possible to use the flanges 18 as the flow paths of the eddy currents. Thus, the conductive members 10a and 10b are disposed directly on attachment seats 16 on the pressure container 1. With this arrangement or configuration also, it is possible to achieve the same advantageous effect as in the first embodiment.

Fifth Embodiment

FIGS. 16A and 16B are drawings of gas insulated switchgear of a three-phase-in-one type according to a fifth embodiment of the present invention. FIG. 16A is a transverse cross-sectional view, whereas FIG. 16B is a lengthwise cross-sectional view. According to the first through the fourth embodiments, the main bus 2 corresponding to one phase is provided in the single pressure container 1. In contrast, in the three-phase-in-one type gas insulated switchgear according to the fifth embodiment, the main buses 2 corresponding to three phases (i.e., a U-phase, a V-phase, and a W-phase) are provided in the pressure container 1. Further, for example, three conductive members 10a are provided on the inside of the pressure container 1. Incidentally, in FIGS. 16A and 16B, some of the constituent elements that are the same as those in the first embodiment are referred to by using the same reference characters.

In the three-phase-in-one type gas insulated switchgear, the flows of the magnetic fluxes having a linkage over the pressure container 1, are different from the example with the single phase, and the eddy currents flow only on the inside of the pressure container 1. Even if the flows of the magnetic fluxes are different, the effect of inhibiting the increase in the temperature achieved by using the conductive members, is the same. Thus, the conductive members 10a are provided only on the inside.

Further, in the three-phase-in-one type gas insulated switchgear, the distance between the cross-sectional inner circumference of the pressure container 1 and each of the main buses 2 (corresponding to the U-phase, the V-phase, and the W-phase) varies depending on the position on the inner circumference. Thus, in the case where the conductive members 10a are provided on the inside of the pressure container 1 as shown in FIG. 16A; by providing the conductive members 10a in such positions that have distant from the main buses 2, it is possible to make the electric insulation distance from the main buses 2 longer and to make the pressure container 1 compact. More specifically, as shown in FIG. 16A, with respect to an imaginary triangle obtained by connecting together the centers of the main buses 2 respectively corresponding to the three phases, each of the conductive members 10a is disposed so as to be in a position that opposes a corresponding one of the apexes of the imaginary triangle, while the opposite side of the apex is interposed between the apex and the conductive member.

Figures 17A, 17B:
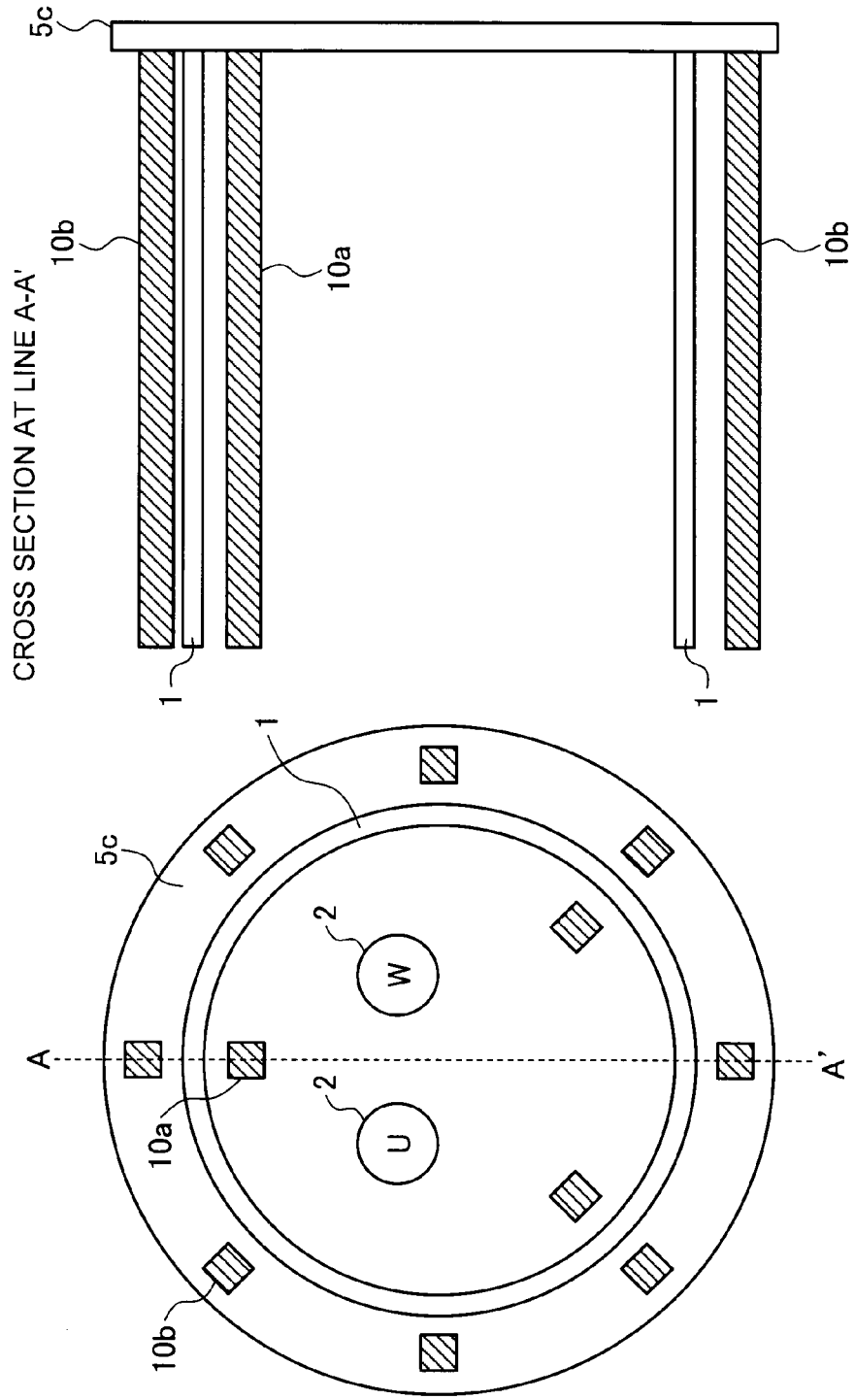
FIGS. 17A and 17B are drawings of an example in which one phase of three-phase buses is missing.

FIGS. 17A and 17B are drawings of an example in which one phase of three-phase buses is missing. Because the one phase is missing, the electric current balance among the three phases becomes imbalance, so that the flows of the eddy currents are the same as those in the example with a single phase (the sum of the U-phase and the W-phase). As a result, because the eddy currents flow both on the inside and on the outside of the pressure container 1 in which the one phase is missing, the conductive members 10a and 10b are provided on the inside and on the outside. With this arrangement, it is possible to achieve the same advantageous effect as in the first embodiment.

INDUSTRIAL APPLICABILITY

An aspect of the present invention is useful in providing gas insulated switchgear that is able to inhibit the eddy currents from flowing on the pressure container when an electric current flows through each of the one or more main buses; and is able to inhibit the increase in the temperature of the pressure container.

The invention claimed is:
1. Gas insulated switchgear comprising:
a pressure container made up of a plurality of cylindrical containers that are electrically conductive and are connected to one another via flange portions formed on ends of the cylindrical containers, an inside of the pressure container being hermetically filled with an electrically-insulating gas;
a circuit breaking unit that is housed in the pressure container;
a main bus that is connected to the circuit breaking unit;
one or more electrically-conductive members that are provided so as to be positioned along a wall surface of the pressure container and along a direction in which the main bus extends and that have higher electric conductivity than electric conductivity of a material of which the pressure container is made; and
an attachment part that is made of an electrically-conductive material and is used for attaching the electrically-conductive members to the pressure container, wherein the attachment part is configured by using at least one of the flange portions.

2. The gas insulated switchgear according to claim 1, wherein the electrically-conductive members of which a quantity is equal to two or more are provided on outside of the pressure container.

3. The gas insulated switchgear according to claim 1, wherein the electrically-conductive members of which a quantity is equal to two or more are provided on inside of the pressure container.

4. The gas insulated switchgear according to claim 1, wherein the electrically-conductive members of which a quantity is equal to two or more are provided on inside and on outside of the pressure container.

5. The gas insulated switchgear according to claim 4, wherein
a quantity of the electrically-conductive members that are provided on the inside of the pressure container is equal to a quantity of the electrically-conductive members that are provided on the outside of the pressure container, and
the electrically-conductive members that are provided on the inside of the pressure container and the electrically-conductive members that are provided on the outside of the pressure container are respectively positioned so as to be equally apart with one another along a circumferential direction of the wall surface of the pressure container on a cross-sectional plane perpendicular to a longer axis of the pressure container.

6. The gas insulated switchgear according to claim 1, wherein
the attachment part is configured by using at least one of the flange portions and an annular-shaped conductor that is fixed onto said at least one of the flange portions and has higher electric conductivity than electric conductivity of the flange portions, and
the electrically-conductive members are attached to said at least one of the flange portions by disposing the annular-shaped conductor between the electrically-conductive members and said at least one of the flange portions.

7. The gas insulated switchgear according to claim 1, wherein a fin is attached to the electrically-conductive members.

8. The gas insulated switchgear according to claim 1, wherein the electrically-conductive members are provided so as to be locally present in a surrounding of the circuit breaking unit.

9. The gas insulated switchgear according to claim 1, wherein
the pressure container is provided with a branching pipe portion that guides the main bus to outside of the pressure container, and the electrically-conductive members are provided so as to be locally present in a surrounding of the branching pipe portion.

10. The gas insulated switchgear according to claim 1, wherein the electrically-conductive members are disposed in a section that is defined by an electrically-insulating substance.

11. The gas insulated switchgear according to claim 1, wherein the gas insulated switchgear is of a three-phase-in-one type.

12. The gas insulated switchgear according to claim 11, wherein
the electrically-conductive members of which a quantity is three are provided on inside of the pressure container, and
the electrically-conductive members are provided in such a manner that, with respect to an imaginary triangle obtained by connecting together centers of the main buses respectively corresponding to three phases on a cross-sectional plane perpendicular to a longer axis of the pressure container, each of the three electrically-conductive members is in a position that opposes a corresponding one of apexes of the imaginary triangle, while an opposite side of the apex is interposed between the apex and the electrically-conductive member.

* * * * *